United States Patent [19]

Sekine

[11] Patent Number: 4,891,796
[45] Date of Patent: Jan. 2, 1990

[54] ICING PREVENTIVE DEVICE FOR ULTRASONIC WAVE TRANSMITTING AND RECEIVING UNIT FOR VEHICLE

[75] Inventor: Takao Sekine, Yokohama, Japan

[73] Assignee: Niles Parts Co., Ltd., Tokyo, Japan

[21] Appl. No.: 837,773

[22] Filed: Mar. 10, 1986

[30] Foreign Application Priority Data

May 13, 1985 [JP] Japan .................................. 60-70453

[51] Int. Cl.$^4$ .............................................. G01S 15/93
[52] U.S. Cl. ........................................ 367/96; 367/99; 340/582
[58] Field of Search ...................... 367/87, 95, 96, 97, 367/99, 902; 342/26; 350/588; 356/4, 5; 340/580–583; 244/134 R, 134 A–134 F

[56] References Cited

U.S. PATENT DOCUMENTS

| | | | |
|---|---|---|---|
| Re. 31,074 | 11/1982 | Nolte .................................. | 367/87 X |
| 2,419,454 | 4/1947 | Le Clair .............................. | 367/99 |
| 2,434,255 | 1/1948 | Bond et al. .......................... | 367/99 |
| 3,011,718 | 12/1961 | Joerren et al. ...................... | 367/902 |
| 3,686,473 | 8/1972 | Shirn et al. ......................... | 350/588 |
| 3,704,442 | 11/1972 | Wright ................................ | 367/96 |
| 3,781,566 | 12/1973 | Meuller ............................. | 340/583 X |
| 3,818,425 | 6/1974 | Peynaud et al. ..................... | 367/99 |
| 4,155,066 | 5/1979 | Galvin ................................ | 340/15 |
| 4,225,950 | 9/1985 | Kotera et al. ....................... | 367/96 |
| 4,279,246 | 7/1981 | Chikama .......................... | 350/588 |
| 4,318,508 | 3/1982 | Glasgow et al. .................... | 367/96 |
| 4,335,613 | 6/1982 | Luukkala ........................ | 340/582 X |
| 4,561,064 | 12/1985 | Brüggen et al. ..................... | 367/902 |
| 4,605,302 | 8/1986 | Lofgren et al. ....................... | 356/4 |
| 4,688,185 | 8/1987 | Magenheim et al. ....... | 244/134 F X |
| 4,695,985 | 9/1987 | Takeoka .............................. | 367/99 |

FOREIGN PATENT DOCUMENTS

52-9935   2/1977  Japan .
53-21953  2/1978  Japan .
58-18295  12/1983 Japan .
59-36680  5/1984  Japan .

OTHER PUBLICATIONS

"Road Ice Detector"; National Detector Report, vol. 24, No. 3; Japan, Jun. 1978; pp. 526-538 and translation; Sato et al.

Primary Examiner—Thomas H. Tarcza
Assistant Examiner—Tod Swann
Attorney, Agent, or Firm—Ronald P. Kananen

[57] ABSTRACT

This invention provides an icing preventive device for a supersonic wave transmitting and receiving unit for a vehicle which is composed of a timing device for outputting a timing signal, a supersonic wave transmitting and receiving device for transmitting a supersonic wave signal and receiving a reflected wave in response to the timing signal, a received signal processing device for amplifying the received signal caused by the reflected wave and processing the waveform of the amplified signal, a control device for controlling a vehicle load in response to the received signal of which waveform is processed, a temperature sensing device for sensing a temperature outside the vehicle, a heater operating device for energizing and heating the heater in response to both decrease in the temperature outside the vehicle and a level of the received signal of the reflected wave, and a heater arranged in the supersonic wave transmitting and receiving device, and further the present invention discloses the technology of the heater operating device composed of an electronic circuit in particular and invented a device which can perform a rational operation and an automatic icing preventive operation in the supersonic wave transmitting and receiving unit.

5 Claims, 3 Drawing Sheets

ICING PREVENTIVE DEVICE FOR ULTRASONIC WAVE TRANSMITTING AND RECEIVING UNIT FOR VEHICLE

BACKGROUND OF THE INVENTION

1. Field of the Invention

This invention relates to an ultrasonic wave device for vehicle which is mounted on the vehicle so as to detect a vehicle height or the like relative to the road surface by a reflected wave from the ultrasonic wave sensor, and more particularly to an icing preventive device for an ultrasonic wave transmitting and receiving unit for automatically preventing icing during operation of a heater operating circuit.

2. Description of the Prior Art

In recent years, various types of sensors have been developed as the vehicle shows a tendency toward high performance, and more particularly as a sensor to be installed outside of the vehicle body. For example, a vehicle retracting sensor for sensing an obstacle may be placed rearward of the vehicle, a so-called back-sonar and a supersonic wave sensor may be used in a so-called supersonic suspension developed to improve a good ride and a driving stability under the most appropriate control of measurement of variation in vehicle height and dampening force of the shock absorber in response to the condition in the road surface such as a bad road surface and the like during the running of the vehicle.

However, the vehicle is not always operated under the most preferable environmental condition. For example, it frequently occurs that the vehicle runs on a snowy road during the winter season, wherein the transmitting and receiving unit shows a decreased height against the road due to an adhesion of snow to the supersonic wave transmitting and receiving unit or icing and normal operation of the unit is frequently hindered.

Due to this fact, in order to prevent such a disadvantage as described above, a device for preventing generation of dewdrops or icing has been developed, in which for example an electrically conductive vibration-proof rubber is arranged in the vibrating element of the supersonic wave transmitting and receiving unit and heated.

However, according to the prior art as described above, the melting operation for the snow or ice adhered to the supersonic wave transmitting and receiving unit is not performed in response to a decreasing in function of the transmitting and receiving unit caused by snow or icing; rather, the heater is merely heated and energized with a manual switch or the heater is heated or energized in response to a sensing of low temperature with a temperature sensor. Thus, the heater may sometimes be energized when the snow or ice is not adhered to the supersonic wave transmitting and receiving unit or even upon completion of the melting of the snow or icing and it may generate a disadvantage that useless electric power is consumed. Further, since the operation for preventing icing was not rational and was troublesome, a delay in operation occurred, resulting in that it was not possible to provide a proper prevention of icing in the supersonic wave transmitting and receiving unit. Further, when the operation of the manual switch was performed manually, a useless operation was present and further showed some problems that the manual switch itself deteriorated and wore out.

SUMMARY OF THE INVENTION

This invention may dissolve the above-described problems with a provision of an icing preventive device in a supersonic wave transmitting and receiving unit for a vehicle which is mounted in the vehicle so as to sense a vehicle height or the like in respect to the road surface with a reflection wave of the supersonic wave sensor characterized in that it is composed of a timing means for outputting a timing signal, a supersonic wave transmitting and receiving means for transmitting the supersonic wave signal and receiving the reflected wave in response to the timing signal, a received signal processing means for amplifying the received signal caused by the reflected wave and processing the wave form, control means for controlling a load of vehicle in response to the received signal of which wave was processed, a temperature sensing means for sensing a temperature out of the vehicle, heater operating means for heating and energizing the heater in response to a decreasing in level of the temperature outside the vehicle and the received signal of the reflected wave, and a heater arranged in said supersonic wave transmitting and receiving means.

With the foregoing arrangement, the supersonic wave transmitting and receiving means transmits the supersonic wave signal and receives the reflected wave in response to the timing signal output by the timing means, controls a vehicle load through control means in response to the received signal having a wave form processed by the received signal processing means. In turn, the heater operating means operates the heater and heats the supersonic wave transmitting and receiving means is response to the sensed temperature sensed by the temperature sensing means and a decreasing in level of the received signal of the reflected wave.

Thus, the heater operating means may perform an automatic melting of snow or ice in response to a decreasing in function of the transmitting and receiving unit caused by snow or ice.

DESCRIPTION OF THE PREFERRED EMBODIMENT

Figure 1:
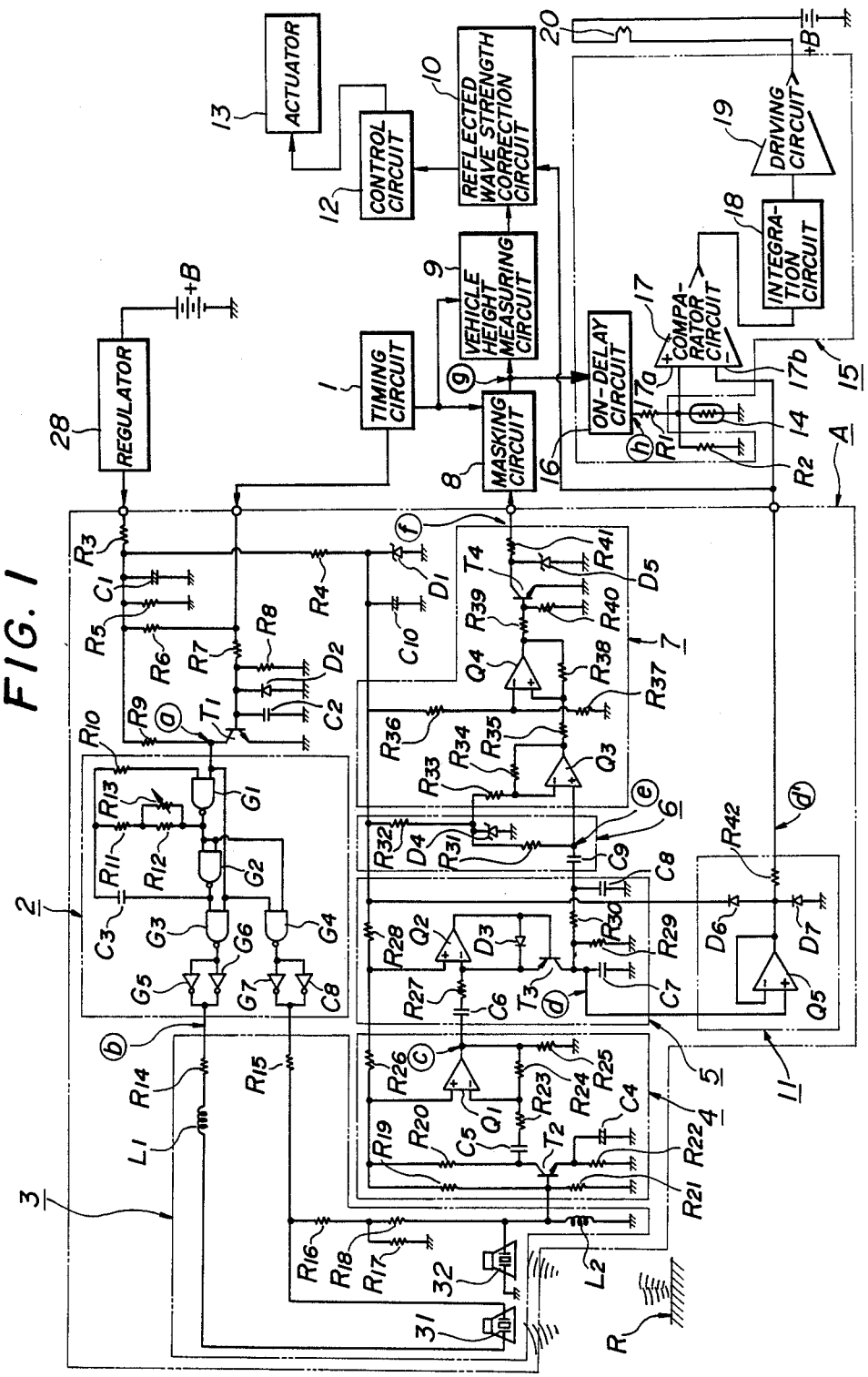
FIG. 1 is an electrical circuit diagram for showing a preferred embodiment of the present invention.

FIG. 1 is an electric circuit diagram for showing a preferred embodiment of the present invention, wherein the figure shows an icing preventive device for a supersonic wave transmitting and receiving unit for a vehicle which is adapted for a supersonic wave sensor for measuring variation in vehicle height in response to the condition in the road surface and is used in a supersonic suspension.

In FIG. 1, a reference numeral 1 indicates a timing circuit acting as a timing means which may produce a timing pulse signal of a desired period, for example, 20 msec.

A reference numeral 2 designates an oscillator for performing an oscillation of 40 kHz, for example, and energizing a sender 31 to be described later in response to an input of timing signal from a timing circuit 1.

A reference numeral 3 denotes a supersonic wave transmitting and receiving circuit acting as a supersonic wave transmitting and receiving means and which is composed of the sender 31 and a receiver 32.

A reference numeral 4 denotes an amplifier circuit which amplifies the supersonic wave signal received by the receiver 32.

A reference numeral 5 designates an envelope line detector circuit in which the amplified signal is rectified in its half wave to obtain the enveloped waveform.

A reference numeral 6 denotes a differentiation circuit which senses only a raised envelope signal, shortens a time of the air turning signal which is directly transmitted from the sender 31 to the receiver 32 and an electrical turning signal transmitted through the circuit, thereby a separation between the turning signal in a masking circuit 8 to be described later and a reflected wave signal is facilitated.

A reference numeral 7 designates a waveform forming circuit in which a differentiated signal is formed into a rectangular waveform. In this figure, the amplifier circuit 4, envelope detector circuit 5, differentiatiion circuit 6 and waveform forming circuit 7 are circuits acting as the received signal processing means, and a combination of each these circuits, the oscillator 2, supersonic wave transmitting and receiving circuit 3 and buffer circuit 11 causes operation of a supersonic wave sensor A. A reference numeral 8 designates a masking circuit which may synchronize with the timing signal from the timing circuit 1 and prohibit a feeding-out of the signal from the waveform forming circuit 7 for a specified period of time, for example, 1 msec.

A reference numeral 9 designates a vehicle height measuring circuit which may synchronize with a timing signal from the timing circuit 1 and measure the vehicle height by measuring an elapsed time Tsec ranging from the output of the timing signal from the timing circuit 1 to the input of the reflected wave signal from the masking circuit 8.

A reference numeral 10 designates a reflected wave strength correction circuit for correcting the vehicle height value signal from the vehicle height measuring circuit 9 in response to the reflected wave strength signal from the buffer circuit 11 to be described later. This correction is performed due to the fact that a delay may be made in the raising of the reflected wave signal under a low strength of the reflected wave, resulting in producing the high measured vehicle height value.

A reference numeral 11 denotes a buffer circuit which may transmit the signal of the envelope detector circuit 5.

A reference numeral 12 designates a control circuit for controlling an actuator 13 for adjusting a damping force of the shock absorber in response to the vehicle height value signal from the reflected wave strength correction circuit 10. In this figure, the masking circuit 8, vehicle height measuring circuit 9, reflected wave strength correction circuit 10 and the control circuit 12 are a control circuit acting as control means, respectively.

A reference numeral 14 denotes a thermistor acting as temperature sensing means which is arranged outside of the vehicle body.

A reference numeral 15 denotes a heater operating circuit acting as a heater operating means in which each of the masking circuit 8, buffer circuit 11 and thermistor 14 is applied as an input for the heater operating circuit, and a heater to be described later is heated and energized in response to a decreasing in level of a surrounding temperature of the vehicle body and the received signal of the reflected wave.

This heater operating circuit 15 is further composed of each of the following circuits. That is, the output of the masking circuit 8 is connected to an on-delay circuit 16. The output part of the on-delay circuit 16 is divided for its voltage via resistors $R_1$ and $R_2$ and the thermistor 14 and then finally connected to a reference input part 17a of a comparator circuit 17. A comparison input part 17b of the comparator circuit 17 is connected to the output part of the buffer circuit 11 and the output part of the comparison circuit 17 is connected to a driving circuit 19 via an integration circuit 18.

A reference numeral 20 denotes a heater which is arranged relative to the sender 31 and the receiver 32 so as to prevent icing under a heated condition of the heater.

Figure 2:
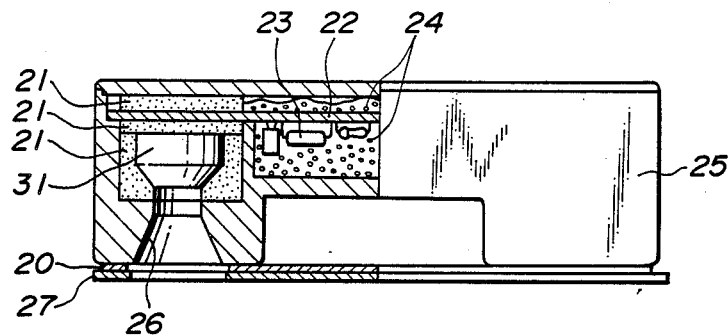
FIG. 2 is a side elevational view partly broken away for showing a heater and a supersonic wave sensor installed in the device of the present invention.
Figure 3:
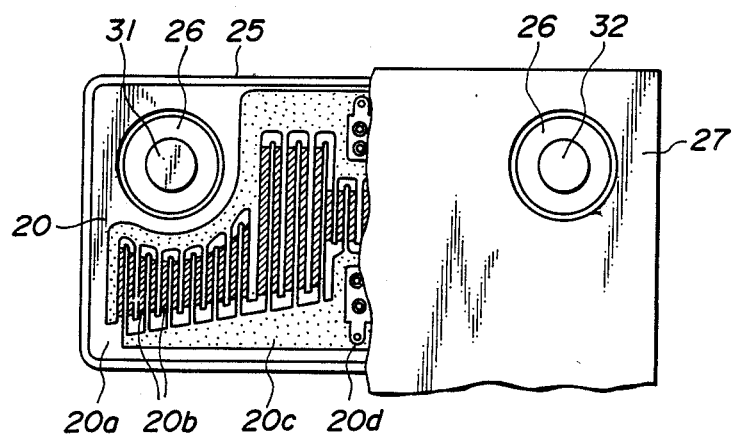
FIG. 3 is a bottom plan view with a partial sectional view of the heater and supersonic wave sensor provided in the device of the present invention shown in FIG. 2.

Referring now to FIGS. 2 and 3, the construction of the heater 20 which is arranged at the sender 31 and the receiver 32 will be described in detail.

FIG. 2 is a side elevational view partly in section for showing the heater 20 and the supersonic wave sensor 3, and FIG. 3 is a front elevational view of FIG. 2.

In the above-noted FIGS. 2 and 3, a reference numeral 21 denotes an isulator for protecting the sender 31 and the receiver 32, the insulator being formed of rubber and the like.

A reference numeral 22 designates a base plate for use in mounting circuit elements 23 which is protected by filler material 24. A reference numeral 25 denotes a casing.

In the casing 25 are formed cone-shaped horns 26 at the front surface of the sender 31 and the receiver 32, and the heater 20 is held by a bracket 27 at the surface to which the horns 26 are opened.

In this figure, the heater 20 is made such that a resistance paste having a positive coefficient of resistance temperature is printed on an insulation base plate 20a composed of material mixed with polyester and glass cloth so as to form the heating part 20b, silver paste is baked at low temperature to form an electrode 20c and then a terminal 20d is fitted to it.

In the supersonic wave sensor A shown in FIG. 1, $R_3$ to $R_{42}$ denote resistors, $C_1$ to $C_{10}$ designate capacitors, $D_1$ to $D_7$ denote diodes, $T_1$ to $T_4$ designate transistors, $G_1$ to $G_4$ denote NAND circuits, $G_5$ to $G_8$ designate NOT circuits, $Q_1$ to $Q_5$ denote differential amplifier circuits and $L_1$ and $L_2$ denote coils for increasing a sound pressure of the sender 31 and expanding a range for Q of receiving and transmitting a signal.

A reference numeral 28 indicates a voltage regulator of 15 V, for example, which is composed of DC-DC converter for increasing a voltage of a battery in a vehicle and producing a specified voltage.

Figure 4:
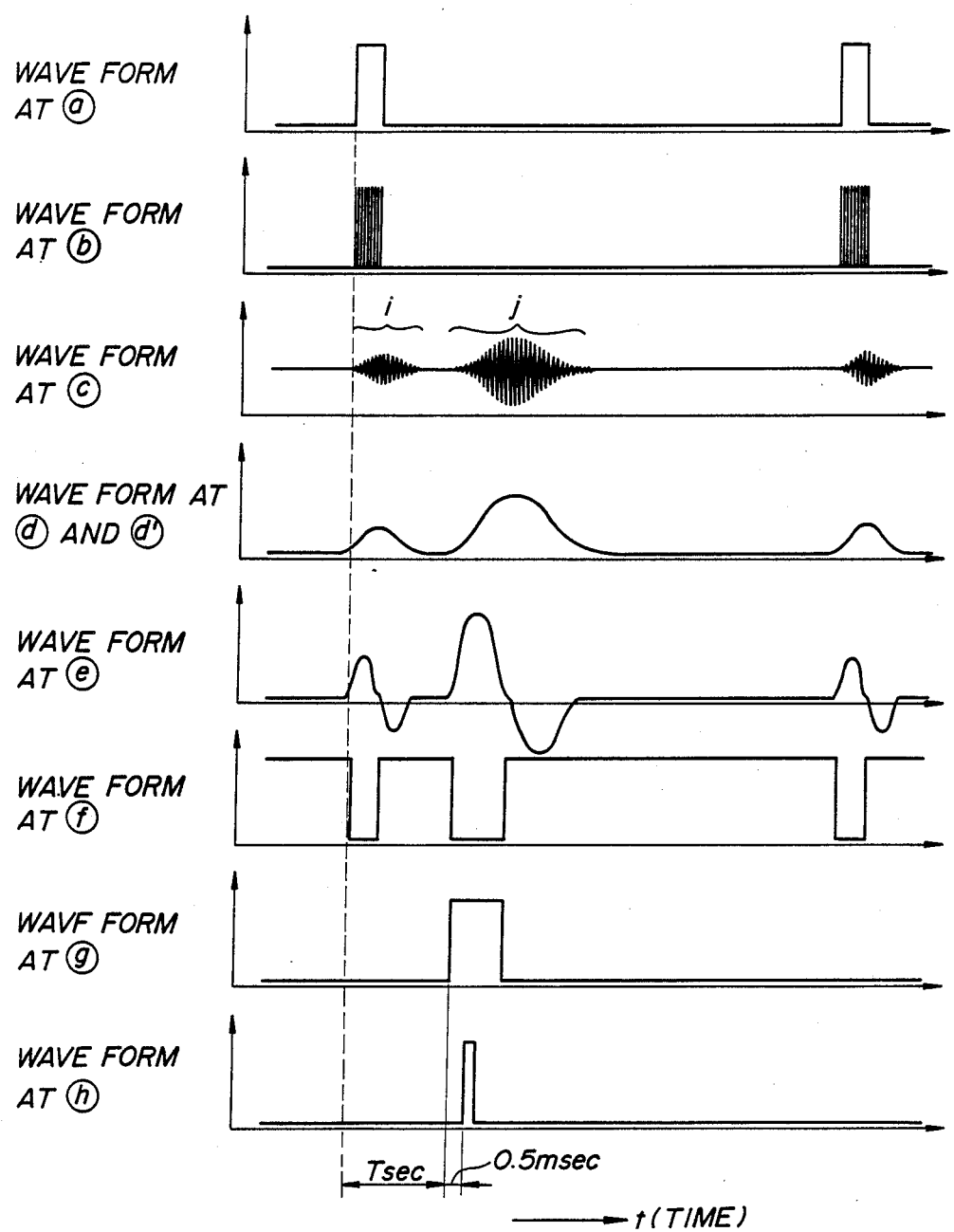
FIG. 4 is a diagram for showing a characteristic of signal waveform at each of the parts in a specified time t for an electrical circuit diagram for showing the preferred embodiment of the device of the present invention shown in FIG. 1.

Referring now to FIG. 4 for showing the signal waveform found at each of the parts, its function will be described in detail. At first, when the device of the present invention starts to operate in response to the starting of running of the vehicle, the timing circuit 1 inputs the timing signal shown at the waveform at a to the oscillator 2 via transistor $T_1$.

The oscillator 2 outputs the oscillating signal shown at the waveform b synchronized with the timing signal and oscillates the sender 31.

The sender 31 may radiate the supersonic wave to the road surface under energization and the receiver 32 receives the wave reflected from the road surface.

The amplifier circuit 4 amplifies an electrical signal caused by a supersonic wave received by the receiver 32 and then inputs the signal shown at the waveform c. A wave-form at i in the waveform at c shows the waveform caused by the turning signal and the waveform at j indicates the waveform caused by the reflected wave signal.

The envelope detector circuit 5 rectifies the signal from the amplifier circuit 4 in its half wave portion and then inputs the envelope signal indicated at the waveform of d into the differentiation circuit 6 and the buffer circuit 11.

The differentiation circuit 6 detects the raising of the envelope signal, inputs the differentiation signal indicated at the waveform at e into the waveform forming circuit 7, and the waveform forming circuit 7 outputs the rectangular signal indicated at the waveform f to the masking circuit 8 of the later stage.

The buffer circuit 11 outputs the reflected wave strength signal indicated at the waveform d to the reflected wave strength correction circuit 10 and the heater operating circuit 15 under the input of the envelope signal.

The masking circuit 8 opens the circuit for a specified period of time in synchronism with the timing signal of the timing circuit 1, eliminates the turning signal and inputs only the reflected wave signal indicated at the waveform at g into the vehicle height measuring circuit 9.

The reflected wave strength correction circuit 10 inputs the proper vehicle height data into the control circuit 12 in response to the vehicle height signal from the vehicle height measuring circuit 9 obtained by the reflected wave signal and the reflected wave strength signal from the buffer circuit 11. Then, the control circuit 12 controls the actuater 13 in response to a variation of vehicle height data corresponding to the condition in the road surface during running of the vehicle and controls the dampening force of the shock absorber.

Now, the action of the heater operating circuit 15 will be described in detail. At first, in the on-delay circuit 16, when the reflected wave signal is input from the masking circuit 8, a reference signal shown at the waveform of h is output after a specified period of time, for example, 0.5 msec, and the divided voltage defined by the resistors $R_1$ and $R_2$ and the thermistor 14 is input to the reference input part 17a of the comparator circuit 17.

At this time, the divided voltage can be varied in response to the resistance value of the thermistor 14, i.e. a temperature of surrounding atmosphere around the vehicle body and the voltage level is set to show a high value when the temperature of the surrounding atmosphere is low.

In turn, to the comparison input part 17b of the comparator circuit 17 is fed a signal of voltage level corresponding to the strength of the reflected wave. This reflected wave strength is decreased by a hardness of road surface found on a snow road, or by icing or clogging of snow at the sender 31 and the receiver 32. Thus, when the temperature of the surrounding atmosphere is low and the voltage level at the comparison input part 17b is lower than the voltage level at the reference input part 17a, the comparator circuit 17 inputs a pulse signal synchronized with the reference signal from the on-delay circuit 16 into the integration circuit 18. The integration circuit 18 outputs a signal to a driving circuit 19 after counting of the desired number of pulse signals, and the heater 20 is energized to remove the icing or clogging of snow in the sender 31 and the receiver 32.

It is apparent that the on-delay circuit 16, comparator circuit 17 and integration circuit 18 in the heater driving circuit 15 can be operated similarly by a program of a micro-computer.

It does not generate any problem if the heater 20 may heat at least near the sender 31 and the receiver 32, and for example, the heater can be buried in the horn portion 26.

As described above in detail, in the present invention, it has a feature in its construction that the heater is operated in response to the second temperature made by the temperature sensing means and a decrease in the level of the received signal so as to prevent any icing and the like. Due to this fact, it has a further superior effect that it can prevent a useless consumption of electric power when the icing or clogging of snow and the like are not generated. The present invention may perform a rational operation, contribute to a durability of the device and at the same time enable a formation with IC (integrated circuit) elements and further can be provided in an icing preventive device for supersonic wave transmitting and receiving unit for vehicle with a high quality.

The device of the present invention may be applied to various vehicles such as automobile, streetcar and the like and its range of application is quite wide.

Although the icing preventive device for a vehicle supersonic wave device for vehicle constructed in accordance with the present invention has been described above, it should be understood that the items required by the present invention are not restricted or limited to this device, but it may include the device having the same action and feature under another preferred embodiment. Therefore, the scope of the present invention should be defined by the following claims.

I claim:

1. A vehicle borne supersonic wave transmitting and receiving device for determining vehicle height with respect to a road surface comprising:

timing means for outputting a timing signal;

supersonic wave transmitting and receiving means for transmitting a supersonic wave and receiving a reflected wave derived from said transmitted wave in response to said timing signal;

processing means for amplifying and processing said received reflected wave;

control means for controlling a vehicle load in response to said amplified and processed received reflected wave temperature sensing means for sensing a temperature outside said vehicle;

heater operating means for energizing a heater in response to said temperature sensing means and a level of the received reflected wave; and a heater connected to said heater operating means and arranged in said supersonic wave transmitting and receiving device.

2. The device of claim 1 wherein said heater operating means is composed of an on-delay circuit, a comparator circuit, an integration circuit and a driving circuit.

3. The device of claim 1 wherein said temperature sensing means includes a thermistor.

4. In a vehicle borne device which transmits and receives supersonic waves for determining vehicle height with respect to a road surface, the improvement therein comprising:
   a de-icing heater in said device;
   a temperature sensing means for sensing a temperature outside the vehicle; and
   a heater operating means for energizing said heater in response to both said temperature sensing means and the level of said received supersonic waves.

5. A vehicle borne supersonic wave transmitting and receiving device for determining vehicle height with respect to a road surface comprising:
   timing means for outputting a timing signal;
   supersonic wave transmitting and receiving means for transmitting a supersonic wave and receiving a reflected wave derived from said transmitted wave in response to said timing signal;
   processing means for amplifying and processing said received reflected wave;
   control means for controlling a vehicle load in response to said amplified and processed received reflected wave;
   temperature sensing means for sensing a temperature outside said vehicle;
   heater operating means for energizing a heater in response to said temperature sensing means and a level of the received reflected wave; and
   a heater connected to said heater operating means and arranged in said supersonic wave transmitting and receiving device,
   said temperature sensing means being positioned in isolation from heat generated by the heater, and said heater operating means including a comparator which outputs control signals to the heater in response to the temperature outside the vehicle and the level of the received reflected wave.

* * * * *